3,152,128
PREPARATION OF MELAMINE
Johannes J. Steggerda, Geleen, Netherlands, assignor to Stamicarbon N.V.
No Drawing. Filed June 11, 1962, Ser. No. 201,314
Claims priority, application Netherlands, June 14, 1961, 265,955
3 Claims. (Cl. 260—249.7)

The present invention relates to a process for continuously preparing melamine.

More particularly, the invention is concerned with certain improvements in the process of preparing melamine continuously by heating urea and/or a product obtained by thermal decomposition of urea at temperatures ranging between 220° and 450° C. in the presence of $NH_3$ and a catalyst with a large internal surface area wherein the starting material is first supplied to a fluidized catalyst bed and the resulting vapors, together with the $NH_3$ serving as carrier gas of the bed, are then passed through a second catalyst bed which is either a fixed or a fluidized bed.

According to the present invention, it has now been found that the first catalyst bed of the above described process can be advantageously replaced by a fluidized bed of inert, solid particles having little, if any, internal surface area. As a result, there is no conversion to melamine in the first stage and the inert solid particles of this bed act only as heat-transferring material whereby the urea supplied to the bed is very rapidly converted into gaseous products. Being particularly cheap, sand is preferred as solid material. However, in addition to sand, or in lieu thereof, any other solid material which is inert in reaction to the starting material and the decomposition products may be used. Thus, as typically suitable materials there may also be mentioned Carborundum corundum and the like.

The process of the present offers the great advantage of a saving of catalyst. Thus, instead of a relatively expensive catalyst, a very cheap material can be used for the first bed. In order to maintain production capacity, the volume of the second catalyst bed must be increased by 30 to 50% but this is more than offset by the overall catalyst savings. Thus, in the usual case where two catalyst beds are used, the total amount of catalyst is 5 to 20 parts based on 1 part of starting material per hour, parts being by weight with the first bed containing from 40 to 75% of the total amount of catalyst. According to the present invention, no catalyst is used in the first bed and the second bed contains from 3 to 10 parts of catalyst per 1 part by weight of starting material per hour. As indicated, this is higher than the amount of catalyst in the second bed of the prior procedure but, on an overall basis, represents a savings of 10 to 50% catalyst.

Usually, the amount of inert solid particles in the first bed will comprise from 5 to 10 times the weight of urea or starting material passed hourly through the bed. However, proportions outside this range can also be used.

The present process may be carried out at atmospheric pressure although higher or lower pressures may also be used.

The size of the inert solid particles used in the first bed herein may be widely varied. Generally speaking, however, the particle size will fall within the range of about 0.1 to 0.2 mm.

The invention is illustrated, but not limited, by the following examples:

*Example 1*

At the rate of 60 kg. per hour, urea was supplied to 900 kg. of sand, particle diameter approximately 0.1 mm., kept fluidized by an $NH_3$-gas flow of 120 m.$^3$ per hour. The temperature of the fluidized sand bed was kept at 350° C.

The $NH_3$-gas flow and the gases formed during the decomposition of urea, chiefly isocyanic acid and $NH_3$, were then passed through a fluidized catalyst bed consisting of 970 kg. of silicagel grains with an internal surface area of 300 m.$^2$ gramme. The temperature of this fluidized catalyst bed was also kept at 350° C. From the fluidized catalyst bed a melamine-containing gas mixture issued from which melamine was separated in the amount of 20 kg. per hour by cooling.

The above example was repeated except that the fluidized bed of sand particles was replaced by a fluidized bed of silicagel powder. Using the same amount of urea and leaving the temperature unchanged, it was found necessary to have the first bed contain 400 kg. and the second bed 605 kg. to give the same melamine production as that obtained using sand in the first stage. Consequently, the saving of catalyst according to the invention amounts to 400+605−970 kg.=35 kg., or 3.5%. Should it be desired to prepare melamine by this process in a much larger installation, for instance, in an installation suited for the preparation of 100 kg. of melamine per hour, a much more considerable saving of catalyst, for instance approximately 30%, is possible.

*Example 2*

As in Example 1, 60 kg. of urea per hour was supplied to a fluidized bed of 900 kg. of sand. Again, a temperature of 350° C. was used with a carrier gas flow of 120 m.$^3$ of $NH_3$ per hour. The gas flow from the fluidized bed was then passed through a fixed catalyst bed consisting of 320 kg. of aluminum phosphate-internal surface area 120 m.$^2$/gramme, temperature 350° C. 20 kg. of melamine per hour were separated from the melamine-containing gas flow issuing from this fixed catalyst bed.

If instead of sand a fluidized bed of aluminum-phosphate particles should be used under otherwise identical reaction conditions, it has been found that the fluidized bed and the fixed bed would have to contain 125 and 250 kg. of $AlPO_4$, respectively, to enable the same melamine production to be achieved. Consequently, the saving of catalyst in the process according to the invention amounts to 125+250−320=55 kg. or 14.5%. If an installation is used with a capacity five times larger than that of the one referred to above a saving of nearly 40% is possible.

The scope of the invention is defined in the following claims wherein:

I claim:

1. In a continuous process for the preparation of melamine by heating a material selected from the group consisting of urea and a product obtained by thermal decomposition of urea at temperatures ranging from 220 to 450° C. in the presence of $NH_3$ and a catalyst with a large internal surface area wherein the material is continuously supplied to a first fluidized catalyst bed and the resulting vapors, together with the $NH_3$ serving as carrier gas for the fluidized bed, is passed through a second catalyst bed, the improvement which comprises utilizing as the first bed, in lieu of a catalyst bed, a catalyst-free fluidized bed of inert, solid particles having little internal surface area and utilizing a temperature of about 350° C. in the first bed.

2. The process of claim 1 wherein said inert solid particles comprise sand.

3. The process of claim 2 carried out at atmospheric pressure and wherein the second bed comprises from 3 to 10 parts catalyst per part by weight of starting material per hour and the amount of inert solid particles in the first bed comprises from 5 to 10 times the weight of starting material per hour.

References Cited in the file of this patent

UNITED STATES PATENTS

| | | |
|---|---|---|
| 2,566,231 | Paden et al. | Aug. 28, 1951 |
| 2,712,491 | Boatright | July 5, 1955 |
| 2,918,467 | Hibbitts et al. | Dec. 22, 1959 |
| 3,095,416 | Crowley et al | June 25, 1963 |

FOREIGN PATENTS

| | | |
|---|---|---|
| 767,344 | Great Britain | Jan. 30, 1957 |